United States Patent
Chang et al.

(10) Patent No.: US 10,121,013 B2
(45) Date of Patent: Nov. 6, 2018

(54) XOR-BASED SCRAMBLER/DESCRAMBLER FOR SSD COMMUNICATION PROTOCOLS

(71) Applicant: Samsung Electronics Co., Ltd., Gyeonggi-do (KR)

(72) Inventors: Chihjen Chang, Fremont, CA (US); Michael Bekerman, Los Gatos, CA (US); Ian Swarbrick, Santa Clara, CA (US); Craig Hanson, San Jose, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 218 days.

(21) Appl. No.: 15/064,191

(22) Filed: Mar. 8, 2016

(65) Prior Publication Data
US 2016/0328567 A1   Nov. 10, 2016

Related U.S. Application Data

(60) Provisional application No. 62/209,166, filed on Aug. 24, 2015, provisional application No. 62/158,420, filed on May 7, 2015.

(51) Int. Cl.
  *G06F 21/60* (2013.01)
  *G09C 1/00* (2006.01)
  (Continued)

(52) U.S. Cl.
  CPC .......... *G06F 21/606* (2013.01); *G06F 12/14* (2013.01); *G06F 21/79* (2013.01); *G06F 21/85* (2013.01); *G09C 1/00* (2013.01); *H04L 9/065* (2013.01)

(58) Field of Classification Search
  CPC ........ G06F 21/606; G06F 12/14; G06F 21/79; G06F 21/85; G09C 1/00; H04L 9/065
  (Continued)

(56) References Cited

U.S. PATENT DOCUMENTS

| 7,113,927 B1 * | 9/2006 | Tanaka | G06Q 30/06 705/1.1 |
| 8,261,159 B1 | 9/2012 | Sommer | |

(Continued)

OTHER PUBLICATIONS

"Error Control Coding and Signal Processing for Flash Memories," Beomkyu Shin; Changkyu Seol; Jung-Soo Chung; and Jun Jin Kong, IEEE International Symposium on Circuits and Systems, DOI: 10.1109/ISCAS.2012.6272049, pp. 409-412, publication: 2012.

*Primary Examiner* — Harunur Rashid
*Assistant Examiner* — Sakinah White Taylor
(74) *Attorney, Agent, or Firm* — Van Pelt, Yi & James LLP

(57) ABSTRACT

Example embodiments for descrambling and scrambling a memory channel include executing a training mode for the memory device to discover XOR vectors used by the host system to scramble data. The training mode inputs all zero training data to a scrambling algorithm for all memory locations of the memory device to generate scrambled training data that is transmitted over the memory channel to the memory device. The scrambled training data are equal to the XOR vectors corresponding to those memory locations. The scrambled training data is received over the memory channel by the memory device and stored as the XOR vectors for each corresponding memory location. During a functional mode, the scrambled data is received over the memory channel for a specified memory location and the XOR vector stored for the specified memory location is used to descramble the scrambled data prior to writing to the specified memory location.

28 Claims, 3 Drawing Sheets

(51) Int. Cl.
*H04L 9/06* (2006.01)
*G06F 12/14* (2006.01)
*G06F 21/79* (2013.01)
*G06F 21/85* (2013.01)

(58) Field of Classification Search
USPC .......................................................... 380/28
See application file for complete search history.

(56) References Cited

U.S. PATENT DOCUMENTS

| | | |
|---|---|---|
| 8,839,073 B2 | 9/2014 | Cohen |
| 2003/0145196 A1* | 7/2003 | Heegard ................. H04L 5/026 |
| | | 713/150 |
| 2005/0078016 A1* | 4/2005 | Neff ................. H04L 25/03866 |
| | | 341/50 |
| 2006/0193395 A1* | 8/2006 | Ferraiolo .................. H04L 7/10 |
| | | 375/265 |
| 2008/0282345 A1* | 11/2008 | Beals ...................... G06F 21/51 |
| | | 726/21 |
| 2010/0005281 A1* | 1/2010 | Buchmann .......... G06F 13/4243 |
| | | 713/2 |
| 2011/0157992 A1* | 6/2011 | Strasser ................. G06F 1/183 |
| | | 365/185.18 |
| 2012/0204079 A1* | 8/2012 | Takefman ............. H03M 13/05 |
| | | 714/758 |
| 2013/0275835 A1 | 10/2013 | Aswadhati |
| 2014/0082260 A1 | 3/2014 | Oh |
| 2014/0173369 A1 | 6/2014 | Chen |
| 2014/0181614 A1 | 6/2014 | Kwok |
| 2014/0237176 A1 | 8/2014 | Takefman |
| 2014/0310534 A1 | 10/2014 | Gurgi |

\* cited by examiner

XOR-BASED SCRAMBLER/DESCRAMBLER FOR SSD COMMUNICATION PROTOCOLS

CROSS-REFERENCE TO RELATED APPLICATIONS

This application claims the benefit of provisional Patent Application Ser. No. 62/209,166, filed Aug. 24, 2015, and provisional Patent Application Ser. No. 62/158,420, filed May 7, 2015, both assigned to the assignee of the present application, and incorporated herein by reference.

BACKGROUND

A solid-state drive (SSD) is different from standard dynamic random access memory (DRAM) in that a host needs to be able to send control information to the SSD and receive status information that is generated by the SSD. Data communications between the host system and the SSD over a DRAM channel may be significantly complicated through the use of data scrambling and optionally error-correcting code (ECC) protection, and other data protection schemes. Most scrambling schemes performed by a host memory controller involve generating a pseudo-random (but deterministic) pattern and performing an exclusive-or (XOR) operation with the pattern and the data to be sent. The pattern value that the data is XORed with may be based on a fixed seed or some combination of a seed and the memory address of the transfer.

For a DDR form factor storage device, it is required that the storage device memory controller is able to descramble the data received over the memory bus to execute the command and store the data in the storage. Similarly, for data retrieved from the storage to be correctly sent back to the host system, the storage device memory controller will need to scramble the data so that the data can be recognized by the host system. This requires the storage device memory controller to be able to apply the same scrambling and/or ECC that was applied by the host memory controller. This means that the scrambling algorithm has to be reversible and cannot have dependency with data on the DDR channel in time.

Full reverse engineering of scrambling algorithms used by the host system is difficult. And even if the scrambling algorithms are known, the scrambling algorithms might vary from one vendor/platform to another.

What is needed is an improved XOR-based scrambler/descrambler for SSD communication protocols, and preferably one that does not require knowledge or full reverse engineering of the scrambling algorithm supplied by the host memory controller.

BRIEF SUMMARY

The example embodiments provide methods and systems for descrambling and scrambling a memory channel. Aspects of exemplary embodiment include: executing a training mode for the memory device to discover XOR vectors used by the host system to scramble data. This is accomplished by inputting all zero training data to a scrambling algorithm for all memory locations of the memory device to generate scrambled training data that is transmitted over the memory channel to the memory device, such that the scrambled training data are equal to the XOR vectors corresponding to those memory locations. The scrambled training data is then received over memory channel by the memory device and the scrambled training data is stored as the XOR vectors for each of the corresponding memory locations. During a functional mode of the memory device, the scrambled data is received over the memory channel for a specified memory location, and the XOR vector stored for the specified memory location is used to descramble the scrambled data prior to writing to the specified memory location.

According to the method and system disclosed herein, the example embodiments provide a process to scramble/descramble channel data without knowledge or fully reverse engineering of the scrambling algorithm supplied by the host memory controller, and the process is independent of any error correcting code (ECC) algorithm supplied by the host memory controller.

BRIEF DESCRIPTION OF SEVERAL VIEWS OF THE DRAWINGS

These and/or other features and utilities of the present general inventive concept will become apparent and more readily appreciated from the following description of the embodiments, taken in conjunction with the accompanying drawings of which.

DETAILED DESCRIPTION

Figure 1:
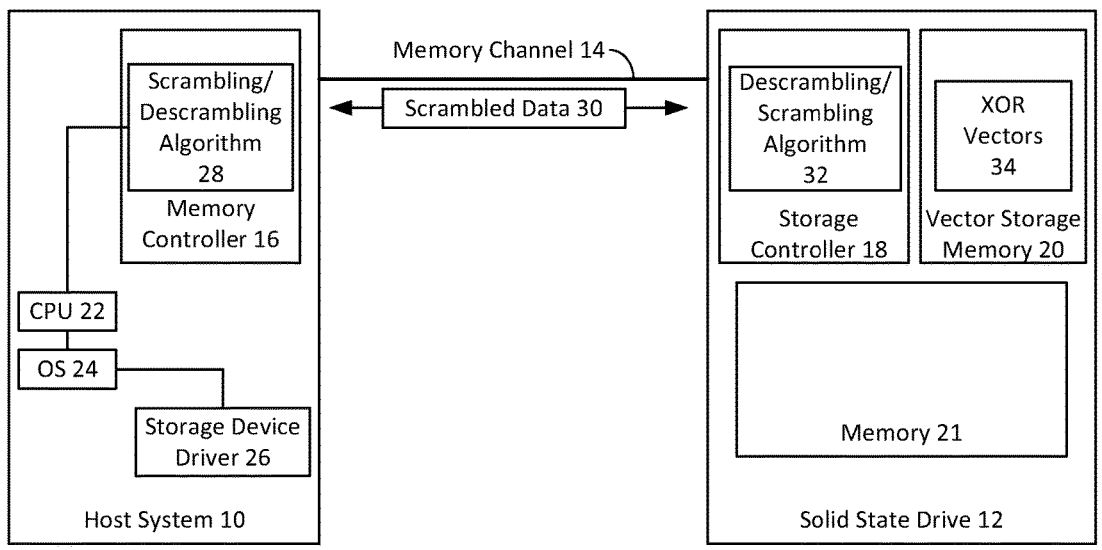
FIG. 1 is a block diagram illustrating an exemplary embodiment of a system for scrambling/descrambling a memory channel between a host system and an SSD.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Advantages and features of the present invention and methods of accomplishing the same may be understood more readily by reference to the following detailed description of embodiments and the accompanying drawings. The present general inventive concept may, however, be embodied in many different forms and should not be construed as being limited to the embodiments set forth herein. Rather, these embodiments are provided so that this disclosure will be thorough and complete and will fully convey the concept of the general inventive concept to those skilled in the art, and the present general inventive concept will only be defined by the appended claims. In the drawings, the thickness of layers and regions are exaggerated for clarity.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The term "algorithm" or "module", as used herein, means, but is not limited to, a software or hardware component, such as a field programmable gate array (FPGA) or an application specific integrated circuit (ASIC), which performs certain tasks. An algorithm or module may advantageously be configured to reside in the addressable storage medium and configured to execute on one or more processors. Thus, an algorithm or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for the components and components or modules may be combined into fewer components or modules or further separated into additional components and components or modules.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

The present invention provides an XOR-based scrambler/descrambler for memory device communication protocols without knowledge or reverse engineering of the scrambling and ECC methods applied by a host system. The method described herein is applicable to different types of memory devices or memory channels where scrambling/error correction occurs, but will be explained with respect to an embodiment where the memory device comprises a solid-state drive (SSD), such as, for example, a single, double or quad rate form-factor SSD.

During an SSD training mode, a scrambling mask value, also referred to herein as an exclusive OR (XOR) vector, which is used by a host system to scramble data for each memory location in the SSD, is discovered through the use of a training sequence and stored in the SSD. The scrambling mask values or XOR vectors are then used to descramble and scramble data received and transmitted, respectively, over the memory channel during a functional mode of the SSD.

FIG. 1 is a block diagram illustrating an example embodiment of a system for scrambling/descrambling a DDR channel between a host system and a DDR form factor SSD without a-priori knowledge or reverse engineering of the scrambling algorithm applied by the host system.

The system includes a host system 10 coupled to an SSD 12 over a memory channel 14. As is well-known, an SSD has no moving parts to store data and does not require constant power to retain that data. Components of the host system 10 that are relevant to this disclosure include a processor 22, an operating system (OS) 24, and a memory controller 16 coupled to the memory channel 14. The memory controller 16 is a digital circuit that manages the flow of data going to and from the host's memory, shown here as the SSD 12. The memory controller 16 can be a separate chip or integrated into another chip, such as the processor 22. The memory controller 16 may additionally provide a memory scrambling feature performed by a scrambling/descrambling algorithm 28 that turns user data transferred to the memory into pseudo-random patterns.

In an embodiment where the SSD 12 is implemented as a double data rate (DDR) form-factor SSD, and the memory channel 14 comprises a DDR memory channel. The DDR form-factor SSD may double the usage of DDR memory channel by transferring data both on the rising and falling edges of the memory bus clock signals.

Key components of the SSD 12 are a storage controller 18 and a memory 21 to store data from the host system 10. The storage controller manages 18 the data stored in the memory 21 and communicates with the host system over the memory channel 14 via communication protocols. The memory 21 may comprise any type of non-volatile random-access memory (NVRAM) including flash memory, ferroelectric RAM (F-RAM), magnetoresistive RAM (MRAM), phase-change memory (PCM), millipede memory, and the like.

Figure 2:
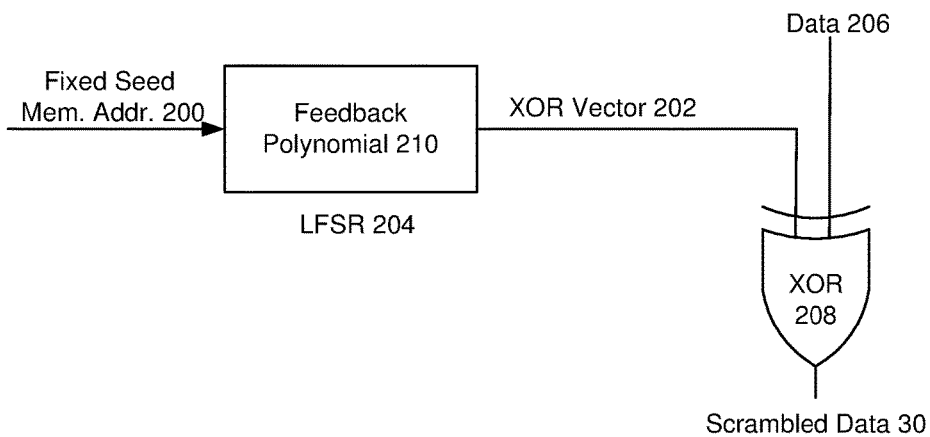
FIG. 2 is a diagram illustrating operation of a conventional scrambling algorithm on the host system.

FIG. 2 is a diagram illustrating operation of a conventional scrambling/descrambling algorithm 28 on the host system. During operation, the host memory controller 16 receives data 206 to be stored in the SSD 12 along with a fixed seed and a memory address 200. The scrambling/descrambling algorithm 28 then generates a random seed (i.e., bit pattern), referred to herein as XOR vector 202, for each DDR channel cycle. In one embodiment the XOR vector 202 may be generated using a Linear Feedback Shift Register (LFSR) 204 or other mechanism using the fixed seed or a combination of the fixed seed and the memory address 200 of the transfer. The scrambling/descrambling algorithm 28 performs an exclusive-or (XOR) operation 208 on the XOR vector 202 and the data 206 entering the memory channel 14 in a given cycle to produce the scrambled data 30. The LFSR 204 may use a feedback polynomial 210 to generate the XOR vector 202. The scrambled data 30 is then sent over the memory channel 14 to the SSD 12, unscrambled and saved to memory 21.

For user data and status information from the SSD 12 to be correctly sent back to the host, the same transformations used by the host memory controller 16 must be applied in the SSD 12. This requires SSD manufacturers to reverse engineer the scrambling algorithms used in various host systems in order for the SSD to be compatible with those host system 10. Furthermore, even if the host scrambling algorithms are known by the SSD manufacturers, the scrambling algorithms might vary among host vendors/platforms, requiring different scrambling/descrambling schemes to be implemented in the SSD 12.

The example embodiments described herein provide a method and system to descramble/scramble a memory channel for an SSD without knowledge or reverse engineering of the scrambling applied by the host memory controller. The example embodiments utilize a storage device driver 26 installed and executed on the host system 10, and a descrambling/scrambling algorithm 32 executed by the SSD storage controller 18 that descrambles the scrambled data 30 received from the host system 10 and scrambles data retrieved from memory 21 to be sent the host system 10. As is well known, a device driver is a computer program that provides a software interface to attached hardware devices (in this case is the SSD 12) enabling the OS 24 and other computer programs to access hardware functions of the device.

Because the XOR vector 202 that is XOR'd with the data 206 may be based on a fixed seed and or a combination of the fixed seed and the memory address 200 of the transfer, for any given physical memory location on the SSD 12, the storage device driver 26 is configured to determine based on a training sequence of zero data for all memory locations the XOR vector 202 used by the host's scrambling/descrambling algorithm 28 for each memory location. The XOR vectors 202 are then sent over the memory channel 14 to the storage controller 18 and saved as XOR vectors 34.

According to one aspect of the example embodiments, the SSD 12 is also provided with a vector storage memory 20 for storing the XOR vectors 34 discovered from the host system 10. Any data stored in the memory 21 at a given memory address is then unscrambled during retrieval using the XOR vectors 34 stored in the vector storage memory 20 for that memory address.

In one embodiment, the vector storage memory 20 may be implemented as SRAM memory or a set of registers. In one embodiment, the vector storage memory 20 may be located internal to the storage controller 18, separate from both the storage controller 18 and the memory 21, or part of the memory 21.

Figure 3:
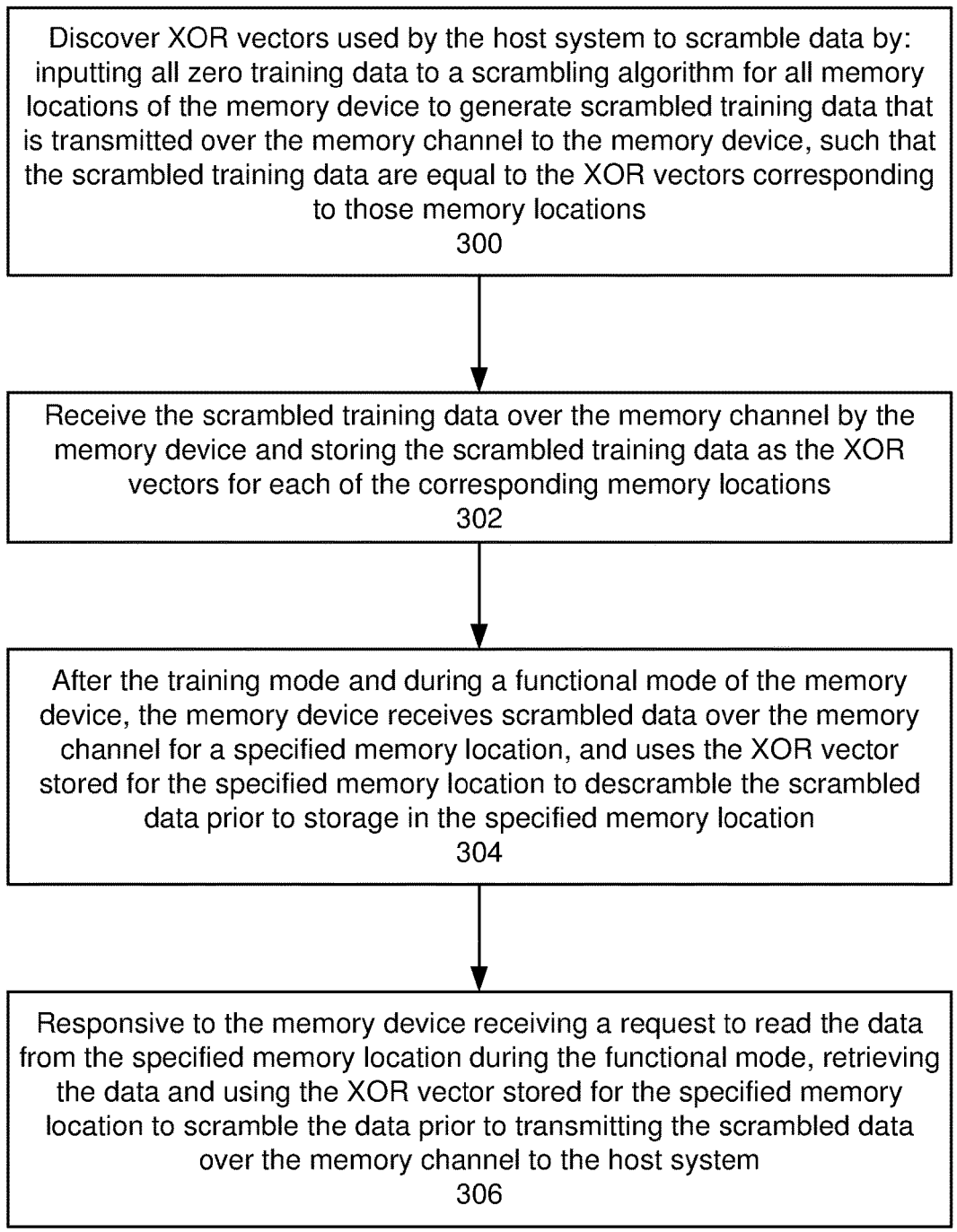
FIG. 3 is a flow diagram illustrating a process for descrambling/scrambling a memory channel for an SSD.

FIG. 3 is a flow diagram illustrating a process for descrambling/scrambling data transmitted via a memory channel for an SSD. The process may begin by executing a training mode for the SSD 12 to discover the XOR vector 202 used by the host system to scramble data by: inputting all zero training data to the scrambling/descrambling algorithm 28 for all memory locations of the SSD 12 to generate scrambled training data 30 that is transmitted over the memory channel 14 to the memory device 21, such that the scrambled training data 30 are equal to the XOR vectors corresponding to those memory locations (block 300). In one embodiment, the training mode may be initiated and performed by the storage device driver 26 on the system 10.

The SSD 12 receives the scrambled training data over the memory channel and stores the scrambled training data as the XOR vectors 34 for each of the corresponding memory locations (block 302).

In one embodiment, the SSD storage controller 18 may receive the scrambled training data and the descrambling/scrambling algorithm 32 may store the XOR vectors. According to one embodiment, the vector storage memory 20 of the SSD 12 is used to store the XOR vectors 34 that are discovered during training mode. Once the XOR vectors 34 for each of the memory locations in SSD 12 are discovered and stored, the storage device driver 26 may signal the SSD 12 that the training mode is complete.

After the training mode and during a functional mode of the memory device, the memory device receives scrambled data over the memory channel for a specified memory location, and uses the XOR vector stored for the specified memory location to descramble the data prior to writing to the specified memory locations (block 304).

In one embodiment, the SSD storage controller 18 may receive the scrambled data and the descrambling/scrambling algorithm 32 may use the XOR vectors 34 to descramble the data.

When reading data from the specified memory location during the functional mode, the memory device retrieves the data and uses the XOR vector stored for the specified memory location to scramble the data prior to transmitting the scrambled data over the memory channel to the host system (block 306).

Figure 4A:
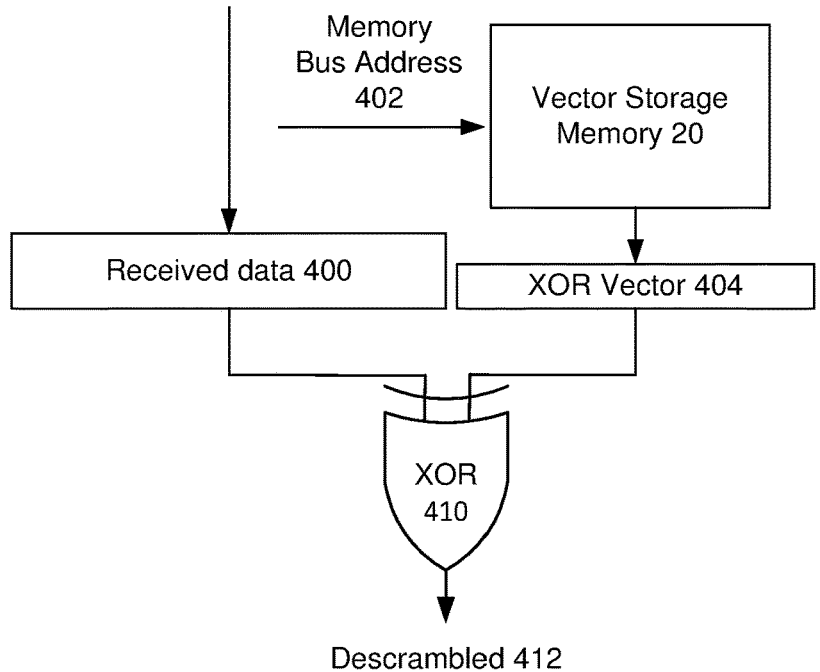
FIGS. 4A and 4B are diagrams illustrating the process performed by the descrambling algorithm in the SSD.
Figure 4B:
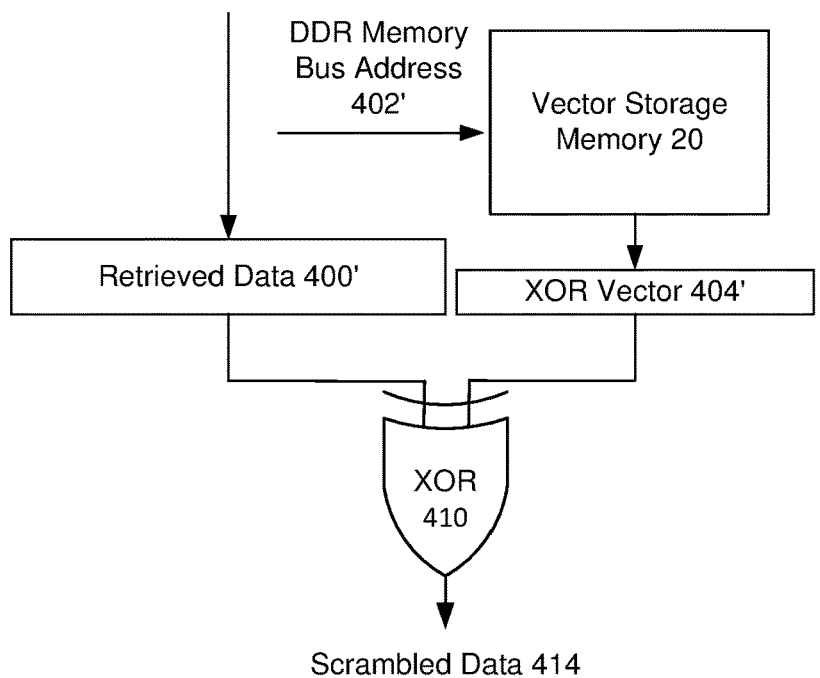

FIGS. 4A and 4B are diagrams illustrating the process performed by the descrambling/scrambling algorithm 32 in the SSD 12 when scrambled data is received from the host system, and scrambling data from memory sent to the host system, respectively. In both FIGS. 4A and 4B, the descrambling/scrambling algorithm 32 operates on received data and a memory bus address. In FIG. 4A, the received data 400 represents scrambled data from the host system 10, and the descrambling/scrambling algorithm 32 uses a memory bus address 402 to retrieve the XOR vector 404 for the specified memory location from the vector storage memory 20. The descrambling/scrambling algorithm 32 performs an exclu-sive-OR operation 410 on the XOR vector 404 and the received data 400 to generate descrambled data 412, which is then stored in the specified memory location.

In FIG. 4B, the received data 400' represents data read from the memory 21, and the scrambling/descrambling algorithm 32 uses the memory bus address 404 to retrieve the XOR vector 404' for the specified memory location from the vector storage memory 20. The descrambling/scrambling algorithm 32 performs the exclusive-OR operation 410 on the XOR vector 404' and the retrieved data 400 to generate scrambled data 414 prior to transmitting the scrambled data 414 over the memory channel 14 to the host system 10.

According to the example embodiments, the process for descrambling and scrambling a memory channel 14 of a SSD 12 as disclosed herein scrambles/descrambles channel data without knowledge of or full reverse engineering of the scrambling algorithm supplied by the host memory controller 16. In addition, the process is independent of any ECC algorithm supplied by the host memory controller 16.

In the process described above with respect to FIG. 3, the term "data" that is used in context of the functional mode is intended to include various types of data transmitted between the host system 10 and the SSD 12, including: Control/Descriptor data, Status data, User data, and Control data.

In the case of Control/Descriptor data, the descrambling/scrambling algorithm 32 may store the XOR vector for each corresponding control/descriptor memory location during training mode and uses the XOR vectors to descramble the Control/Descriptor data during functional mode, as described above.

In the case of Status data, the descrambling/scrambling algorithm 32 may store the XOR vector for each corresponding status memory location during training mode, and uses the XOR vectors to scramble the Status data during functional mode, as described above. If error correcting code (ECC) is enabled on the host system 10, the descrambling/scrambling algorithm 32 may append the scrambled data with the correct ECC code words.

In the case of User data and Control data, the descrambling/scrambling algorithm 32 may store the XOR vector for each corresponding User data memory location during training mode, and uses the XOR vectors to scramble the User data and Control data during a read of the memory 21 during the functional mode, as described above. For a write to memory 21 during functional mode, the descrambling/scrambling algorithm 32 descrambles the User data and the Control data prior to writing to the memory 21, as described above. Note that Read User data and Write User data can share the same memory location or use different memory locations. For the case of sharing the same memory location for Read and Write User data, the storage space requirement for storing the XOR vectors may be reduced.

Accordingly, the vector storage memory 20 may be partitioned into different areas (not shown) to store the XOR vectors of the different types of data. In one embodiment, the vector storage memory 20 may include one or more of: a Control/Descriptor data vector area, a Status data vector area, User data vector area, and a Control data vector area.

In one embodiment, if the host system 10 has error-correcting code (ECC) enabled, then the storage device driver 26 may be configured to generate all zero ECC code words as the training data that is input to the scrambling/descrambling algorithm 28 during the training mode.

The most common single-error correcting and double-error detecting (SECDED) ECC implementations result in all zero code-words for all zero data, but some do not. For scenarios where the ECC implementation of the system 10 does not result in all zero code-words for all zero data, step 300 may split the training phase into two steps.

In the first step, the storage device driver 26 may disable scrambling on the host memory controller 16, followed by inputting all zero training data to the scrambling/descrambling algorithm 28 to determine if they are zero or nonzero. Next, the ECC code word bit locations in each data cycle and their values for all memory locations are recorded by the storage controller 18 and system firmware.

In the second step, the storage device driver 26 enables scrambling on the host memory controller 16, sends all zeros using the ECC code words from the first step to the scrambling/descrambling algorithm 28 as training data, and the descrambling/scrambling algorithm 32 records the XOR vector for all memory locations in the vector storage memory 20. For non-zero ECC code word, this process should indicate that for every bit position where non-scrambled ECC code word generated a one, the corresponding XOR vector bit captured during training must be inversed.

The invention could be generally applied to any application where a non-DRAM memory device is attached to any scrambled channel and needs to exchange information with a host.

In one embodiment, the descrambling/scrambling algorithm 32 is implemented as a software component. In another embodiment, the descrambling/scrambling algorithm 32 could be implemented as a combination of hardware and software. Although the descrambling/scrambling algorithm 32, the storage controller 18 and the vector storage memory 20 are shown as single components, the functionality of each may be combined into a lesser or a greater number of modules/components. For example, in one embodiment, the descrambling/\algorithm 32, the descrambling/algorithm 32 may be implemented as one software component for the descrambling algorithm and a second software component for the scrambling algorithm. In another embodiment, the descrambling/algorithm 32, the storage controller 18 and the vector storage memory 20 may be implemented as one integrated component.

The scrambling/descrambling system of the example embodiments may be applied to a broad range of storage markets from client to enterprise, which could be applied to a disk for a single standalone machine (such as desktop, laptop, workstation, server, and the like), storage array, software-define storage (SDS), application-specific storage, virtual machine (VM), virtual desktop infrastructure (VDI), content distribution network (CDN), and the like.

In one embodiment, for example, the memory 21 of the SSD 12 may be formed of a plurality of non-volatile memory chips, i.e., a plurality of flash memories. As another example, the memory 21 may be formed of different-type non-volatile memory chips (e.g., PRAM, FRAM, MRAM, etc.) instead of flash memory chips. Alternatively, the memory 21 can be formed of volatile memories, i.e., DRAM or SRAM, and may have a hybrid type where two or more types of memories are mixed.

A method and system for descrambling and scrambling data transmitted via a memory channel of a memory device has been disclosed. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Software written according to the present invention is to be either stored in some form of computer-readable medium such as a memory, a hard disk, or a CD/DVD-ROM and is to be executed by a processor. Accordingly, many modifications may be made by one of ordinary skill in the art without departing from the spirit and scope of the appended claims.

We claim:

1. A method for descrambling and scrambling data transmitted via a memory channel of a memory device coupled to a host system, the method, comprising:
   executing a training mode for the memory device to discover XOR vectors used by the host system to scramble data by:
      inputting all zero training data to a scrambling algorithm for all memory locations of the memory device to generate scrambled training data that is transmitted over the memory channel to the memory device, such that the scrambled training data are equal to the XOR vectors corresponding to those memory locations;
   receiving the scrambled training data over the memory channel by the memory device and storing the scrambled training data as the XOR vectors for each of the corresponding memory locations; and
   after the training mode and during a functional mode of the memory device, receiving, by the memory device, scrambled data over the memory channel for a specified memory location, and using an XOR vector of the XOR vectors stored for the specified memory location to descramble the scrambled data prior to writing to the specified memory location.

2. The method of claim 1, further comprising:
   when reading the data from the specified memory location during the functional mode, retrieving the data and using the XOR vector stored for the specified memory location to scramble the data prior to transmitting the scrambled data over the memory channel to the host system.

3. The method of claim 1, wherein a storage device driver on the host system initiates the training mode.

4. The method of claim 1, wherein during the training mode a storage controller on the memory device receives the scrambled training data and a descrambling and scrambling algorithm stores the XOR vectors.

5. The method of claim 4, wherein the memory device includes a vector storage memory that stores the XOR vectors.

6. The method of claim 1, wherein receiving the scrambled data during the functional mode further comprises:
   retrieving, by a descrambling and scrambling algorithm on the memory device, the XOR vector for the specified memory location from a vector storage memory of the memory device and performing an exclusive-OR operation on the XOR vector and the scrambled data to generate descrambled data, which is then stored in the specified memory location.

7. The method of claim 1, wherein the scrambled data received during the functional mode includes at least one of: Control/Descriptor data, Status data, User data, and Control data.

8. The method of claim 7, wherein when the scrambled data includes the Control/Descriptor data, a descrambling and scrambling algorithm on the memory device stores the XOR vector for each corresponding control/descriptor memory location during the training mode.

9. The method of claim 8, wherein when the descrambling and scrambling algorithm uses the XOR vectors to descramble the Control/Descriptor data during the functional mode.

10. The method of claim 7, wherein when the scrambled data includes Status data, a descrambling and scrambling algorithm on the memory device stores the XOR vector for each corresponding status memory location during the training mode.

11. The method of claim 10, wherein when the descrambling and scrambling algorithm uses the XOR vectors to scramble the Status data during the functional mode.

12. The method of claim 7, wherein when the scrambled data includes the User data and Control data, a descrambling and scrambling algorithm on the memory device stores the XOR vector for each corresponding User data memory location during the training mode.

13. The method of claim 12, wherein when the descrambling and scrambling algorithm uses the XOR vectors to scramble the User data and Control data during a read of the memory device during the functional mode; and for a write to the memory device during the functional mode, the descrambling algorithm descrambles the User data and the Control data prior to writing to the memory device.

14. The method of claim 7, further comprising:
storing the XOR vectors in a vector storage memory on the memory device, wherein the vector storage memory is partitioned into different areas including one or more of: a Control/Descriptor data vector area, a Status data vector area, a User data vector area, and a Control data vector area, to store the XOR vectors for the corresponding type of data.

15. A system for descrambling and scrambling data transmitted via a memory channel of a memory device coupled to a host system, comprising:
a storage device driver installed on the host system that executes a training mode for the memory device to discover XOR vectors used by the host system to scramble data by:
inputting all zero training data to a scrambling algorithm for all memory locations of the memory device to generate scrambled training data that is transmitted over the memory channel to the memory device, such that the scrambled training data are equal to the XOR vectors corresponding to those memory locations; and
a storage controller on the memory device configured to:
receive the scrambled training data over the memory channel and store the scrambled training data as the XOR vectors for each of the corresponding memory locations; and
after the training mode and during a functional mode of the memory device, receive scrambled data over the memory channel for a specified memory location, and use an XOR vector of the XOR vectors stored for the specified memory location to descramble the scrambled data prior to writing to the specified memory location.

16. The system of claim 15, wherein when reading the data from the specified memory location during the functional mode, the memory device retrieves the data and uses the XOR vector stored for the specified memory location to scramble the data prior to transmitting the scrambled data over the memory channel to the host system.

17. The system of claim 15, wherein during the training mode a storage controller on the memory device receives the scrambled training data and a descrambling algorithm stores the XOR vectors.

18. The system of claim 17, wherein the memory device includes a vector storage memory that stores the XOR vectors.

19. The system of claim 15, wherein while receiving scrambled data during functional mode, a descrambling and scrambling algorithm on the memory device retrieves the XOR vector for the specified memory location from a vector storage memory of the memory device and performs an exclusive-OR operation on the XOR vector and the scrambled data to generate descrambled data, which is then stored in the specified memory location.

20. The system of claim 15, wherein the scrambled data received during functional mode includes at least one of: Control/Descriptor data, Status data, User data, and Control data.

21. The system of claim 20, wherein when the scrambled data includes the Control/Descriptor data, a descrambling and scrambling algorithm on the memory device stores the XOR vector for each corresponding control/descriptor memory location during the training mode.

22. The system of claim 21, wherein the descrambling and scrambling algorithm uses the XOR vectors to descramble the Control/Descriptor data during the functional mode.

23. The system of claim 20, wherein when the scrambled data includes Status data, a descrambling and scrambling algorithm on the memory device stores the XOR vector for each corresponding status memory location during the training mode.

24. The system of claim 23, wherein the descrambling and scrambling algorithm uses the XOR vectors to scramble the Status data during the functional mode.

25. The system of claim 20, wherein when the scrambled data includes the User data and Control data, a descrambling and scrambling algorithm on the memory device stores the XOR vector for each corresponding User data memory location during the training mode.

26. The system of claim 25, wherein the descrambling and scrambling algorithm uses the XOR vectors to scramble the User data and Control data during a read of the memory device during the functional mode; and for a write to the memory device during the functional mode, the descrambling and scrambling algorithm descrambles the User data and the Control data prior to writing to the memory device.

27. The system of claim 20, further comprising: storing the XOR vectors in a vector storage memory on the memory device, wherein the vector storage memory is partitioned into different areas including one or more of: a Control/Descriptor data vector area, a Status data vector area, a User data vector area, and a Control data vector area, to store the XOR vectors for the corresponding type of data.

28. An executable software product stored on a non-transitory computer-readable storage medium containing program instructions for descrambling and scrambling a data transmitted on a memory channel of a memory device coupled to a host system, the program instructions for:
executing a training mode for the memory device to discover XOR vectors used by the host system to scramble data by:
inputting all zero training data to a scrambling algorithm for all memory locations of the memory device to generate scrambled training data that is transmitted over the memory channel to the memory device, such that the scrambled training data are equal to the XOR vectors corresponding to those memory locations;

receiving the scrambled training data over the memory channel by the memory device and storing the scrambled training data as the XOR vectors for each of the corresponding memory locations; and after the training mode and during a functional mode of the memory device, receiving, by the memory device, scrambled data over the memory channel for a specified memory location, and using an XOR vector of the XOR vectors stored for the specified memory location to descramble the scrambled data prior to writing to the specified memory location.

* * * * *